Patented Feb. 12, 1952

2,585,035

UNITED STATES PATENT OFFICE 2,585,035

UNSATURATED ETHERS OF POLYHYDRIC ALCOHOLS AND POLYMERS THEREOF

John Robert Roach and Harold Wittcoff, Minneapolis, Minn., assignors to General Mills, Inc., a corporation of Delaware No Drawing. Application October 24, 1946, Serial No. 705,484

26 Claims. (Cl. 260—67)

The present invention relates to unsaturated ethers of highly functional alcohols resulting from the condensation of polyfunctional alkylating agents with polyhydroxy compounds. It relates further to polymers of these unsaturated ethers and to methods of preparing the unsaturated ethers and polymers.

For many purposes highly unsaturated compounds are desirable. For example, in the protective coating field compounds containing a number of unsaturated groups are used in coatings because of their drying characteristics. The rate of drying of these compounds is dependent upon the degree of unsaturation. The unsaturated ethers of the present invention possess a high degree of unsaturation and lend themselves readily to rapid polymerization. The polymerization may be interrupted by known methods to yield a product whose viscosity is several hundred times that of the original product or it may be polymerized further to yield light colored, or water-white, clear, highly transparent infusible polymers which are extremely hard and insoluble, and which are heat resistant and fireproof. These polymers also display a marked resistance to water, dilute acid, alkali, or other chemicals. Moreover these polymeric substances when cast into films demonstrate unusual adherence to glass, wood and metal and are particularly adaptable to application in the protective coating field.

It is therefore an object of the present invention to provide unsaturated ethers resulting from the etherification of highly functional alcohols obtained by the reaction of a polyfunctional alkylating agent with a polyhydroxy compound.

It is another object of the invention to provide allyl ethers of the above mentioned highly functional alcohols.

It is another object of the invention to provide polymers of the above described unsaturated ethers, which polymers are highly transparent, infusible, extremely hard and insoluble, heat resistant, resistant to water and dilute alkali, and which demonstrate unusual adherence to glass, wood, and metal.

It is a further object of the present invention to provide a process for preparing such unsaturated ethers and polymers.

The highly functional alcohols employed for the preparation of the unsaturated ethers are described in detail in our copending application, Serial No. 705,489, now U. S. Patent 2,537,726, filed of even date herewith, and entitled Polyhydric Alcohols. As disclosed in that application, the highly functional alcohols are characterized by a high molecular weight and by cross-linking within the molecule. In this respect they differ from practically all known polyhydric alcohols, some of which may possess branched chains, but none of which possess any degree of cross-linking. This property of cross-linking within the polyhydric alcohol molecule, together with the relatively high molecular weight of the alcohol, is reflected very favorably in the unsaturated ether derivatives of these alcohols. Thus, for example, the allyl and substituted allyl ethers are relatively viscous materials which lend themselves readily to polymerization, and which possess gel times which are phenomenally rapid. Thus, for example, the allyl ether of the condensation product of glycerol and glycerol dichlorohydrin possessed a gel time of 64–68 minutes at 98° C. whereas by way of comparison the triallyl ether of glycerol possesses a gel time of 207 minutes under identical polymerization conditions. This decrease in polymerization time and the ease with which these materials may be polymerized to extremely viscous substances are of extreme importance particularly in the protective coating field.

PREPARATION OF THE HIGHLY FUNCTIONAL ALCOHOLS

As pointed out in the above mentioned application, these highly functional alcohols are produced by the condensation of polyfunctional alkylating agents, such as a polyhalogen compound or a polyepoxide, with a polyhydroxy compound containing free or potential hydroxyl groups. The reaction proceeds readily and in a very simple manner. While any of the conventional etherifying procedures may be followed, it is preferred to employ as the condensing medium a solution of a concentrated caustic alkali such as a 50% aqueous sodium hydroxide solution. The polyhydroxy alcohol may be mixed with the requisite amount of caustic alkali solution, usually a 0.1 molar excess based on the amount of etherifying reagent. Then the etherification reagent may be added all at once or slowly over a period of several hours with agitation and heating. Thereafter, the precipitated inorganic material is removed by filtration and the filtrate is neutralized and concentrated under reduced pressure. From the residue the desired product may be obtained by extracting with an alcohol such as methanol, ethanol, propanol, or isopropyl alcohol or other solvent in which the polyhydric alcohol is soluble and the inorganic material is insoluble.

Where epoxides are used as the etherifying reagent, the reaction proceeds much more rapidly and it is usually necessary to use only a catalytic amount of caustic alkali, acid, or acid salt, as the condensing agent. In some instances it may be necessary to cool the reaction. On the other hand, where halogen derivatives of relatively low degree of activity are used such as 2-chloro-ethyl ether it may be advisable to employ more severe conditions such as those obtainable with an autoclave.

Considerable variation is possible with respect to time and temperature. Thus the reaction time may extend from one to twelve or more hours, whereas the temperature may vary from room temperature in the case of epoxides, to 150° C. or more in the case of halides.

Considerable variation is possible in the polyhydroxy compound and in the polyfunctional alkylating agent employed for the preparation of the highly functional alcohol. Suitable polyhydroxy compounds or derivatives thereof, include ethylene glycol, propylene glycol, butylene glycol, glycerol, diglycerol, triglycerol, higher polyglycerols, pentaerythritol, dipentaerythritol, higher polypentaerythritols, 2,2,6,6 - tetramethylolcyclohexanol, 3,3,5,5 - tetramethylol-pyran-4-ol, 3,3,5-trimethylol - 5 - methylpyran - 4 - ol, 3,5-dimethylol-3,5-dimethylpyran - 4 - ol, erythritol, erythrose, xylitol, xylose, sorbitol, mannitol, glucose, sucrose, and the like, and any ester or ether of the above types of compounds. In addition, there may be employed as a polyhydroxy compound such substances as glycerol monochlorohydrin, glycerol dichlorohydrin, mono- or dichlorohydrins of diglycerol, triglycerol, tetraglycerol, etc. (which are obtainable by the addition of hypochlorous acid to allyl ethers as disclosed in our copending application, Serial No. 705,485, now U. S. Patent 2,579,515, entitled Halohydroxypropyl Ethers, filed of even date herewith), monoallylglycerol, monoallydiglycerol, monoallydiglycerolmonochlorohydrin (which is obtainable by the addition of one mole of hypochlorous acid to diallyl ether), glycidol, glycerolglycidol, diglycerolglycidol, pentaerythritol mono- or dihalohydrin, and the chloro-derivatives of 2,2,6,6-tetramethylolcyclohexanol or 3,3,5,5-tetramethylolpyran-4-oil, epichlorohydrin, the diepoxide of diallylether, the diepoxide of diallylglycerol (which diepoxides are obtainable by treating the dichlorohydrins of di- and triglycerol with strong alkali), and the like. It will be noted that there are included compounds such as glycerol dichlorohydrin and epichlorohydrin which contain only one hydroxyl group. However, under the conditions of the reaction, once the alkylation process starts, some of the halogen atoms are replaced by hydroxyl groups, making the compound, in effect, a polyhydroxy compound.

Suitable polyfunctional alkylating reagents include glycerol dihalohydrins (chloro, bromo, iodo), epihalohydrin, diglyceroldihalohydrin, triglyceroldihalohydrin, the diepoxide of diallyl ether, the diepoxide of diallylglycerol, tetraglyceroldihalohydrin, and similar reagents which serve not only to introduce cross-linking, but which at the same time, introduce additional hydroxyl groups into the molecule, thus serving the very valuable purpose of increasing the hydroxyl functionality. Still other compounds which have been found valuable are those such as 1,4-dichloro - 2 - butene, 1,2-dichloro-3-butene, 1,2-dichloroethylene, 1,1 - dichloroethylene, any of the dichloropropylenes, and similar compounds. These reagents introduce not only cross-linking but also carbon-to-carbon unsaturation which imparts valuable properties to the highly functional alcohol, especially if it is to be converted to derivatives which are to be polymerized. Still other reagents which have been found valuable as di- or higher polyfunctional etherifying reagents include 2-chloroethyl ether, ethylene dichloride, ethylene dibromide, 1,2,3-trichloropropane, the bis(chloromethyl)-benzenes, 3,5 - dichloronitrobenzene, and in fact any compound containing two or more halogen atoms which are sufficiently reactive.

It will be apparent that some of these alkylating agents are only bifunctional as are some of the polyhydroxy compounds. In order to obtain cross-linkages, it is necessary that at least one of the reactants have a higher functionality than two. In the case of the alkylating agent, there must be at least two alkylating groups which may be in the form of halogen, epoxide groups, and the like. In addition, the alkylating agent may contain hydroxyl groups which may be alkylated. Thus, for the present reaction, it is only necessary that the alkylating agent contain at least two alkylating groups and that the total number of groups capable of entering into the reaction be at least five. Thus the reactants, ethylene glycol and glycerol dichlorohydrin, have the requisite functionality.

It will be apparent that the highly functional alcohols which are employed for etherification are capable of quite wide variation. Thus the functionality of the highly functional alcohols is dependent upon the number of hydroxyl groups in the polyhydroxy compounds used in the condensation, and upon the number of hydroxyl groups, if any, in the alkylating agent, as well as upon the relative ratio of reactants and the degree to which the reaction is carried. It will be apparent likewise that considerable variation is possible in the unsaturated ethers of this highly functional alcohol. Thus while it is preferred to etherify the hydroxyl groups as much as possible with unsaturated groups, this etherification may be conducted to any lesser degree as long as at least one unsaturated group is introduced into the molecule. Thus the unsaturated ethers will possess varied properties depending upon the number of hydroxyl groups originally present in the molecule of the highly functional alcohol, and the extent to which these have been converted into unsaturated ether groups.

PREPARATION OF THE UNSATURATED ETHERS FROM THE HIGHLY FUNCTIONAL ALCOHOLS

The unsaturated ethers which are formed by the present invention are those which contain a lower unsaturated aliphatic group. The preferred unsaturated aliphatic group is the allyl group, but other suitable groups are vinyl, methallyl, ethylallyl, cinnamyl, crotyl, chloroallyl, chlorocrotyl, propargyl, methylvinylcarbinyl, tiglyl, isopropenylvinylcarbinyl, divinylcarbinyl, 2,4-hexadiene-1-yl, 2 - methyl - 2 - hexane-1-yl, 1-butene-4-yl, and the like.

The etherifications are effected by causing these highly functional alcohols to react with an unsaturated alkylating agent such as the halide; for example, allyl halide or methallyl halide, according to known etherification procedures. It has been found particularly advantageous, however, to employ as a condensing agent a strong caustic solution such as 50% NaOH or basic substance of similar nature. In general, the highly functional alcohol and the base may be mixed, after which the halide may be added slowly with suitable agitation at a temperature of 70-110° C. although slightly lower or higher temperatures may be used. The order of addition likewise may be reversed with satisfactory results. Thus the halide and the highly functional alcohol may be mixed after which the base is added slowly with stirring. When all the reagents have been brought into contact, the reaction mixture may advantageously be heated at the desired temperature with stirring for a length of time varying from one to four hours although longer heating is not deleterious. When the etherification has been effected, the product together with some admixed halide form an upper layer in the reaction vessel, and may be removed and washed to destroy alkalinity, after which the unreacted halide is readily recovered by distillation. More product may be recovered from the aqueous salt mixture which forms the bottom layer in the reaction vessel by extraction with a suitable solvent such as ether or benzene or other common organic solvent.

In general, it is preferred to use an excess of unsaturated halide and an even larger excess of alkali, since such conditions tend to yield more complete etherification and at the same time to decrease the amount of hydrolysis of etherification reagent. By this one-step etherification process the degree of substitution in the highly functional alcohol is approximately 75%, yielding products which are readily adaptable for polymerization purposes, for it is by no means necessary to use completely etherified materials in order to obtain highly desired polymers. If, however, completely etherified products are desired, the partially etherified material may be treated with a calculated amount of sodium or any similarly reactive metal at a temperature approximating the melting point of the metal. Once the metallic derivative has formed, the reaction mixture is treated with more unsaturated halide to yield a fully etherified material.

As disclosed in the above mentioned copending application, the highly functional alcohols are usually prepared in the presence of strong caustic such as 50% sodium hydroxide. Since such conditions are also expeditious for the preparation of the unsaturated ethers from the corresponding unsaturated halides, both the condensation and the etherification with the unsaturated halide may be carried out in the same reaction vessel without isolating the polyhydric alcohol. Thus, the polyhydroxy compound from which the highly functional alcohol is to be prepared is mixed with the alkali, after which the polyfunctional alkylating agent is added. Thereafter, more alkali may be added, unless sufficient alkali may have been added at the start of the reaction, and then the unsaturated halide is added and sufficient time for reaction is allowed. Usually a temperature of 70-120° C. is employed for both steps. Also, the time ordinarily allowed to effect the condensation to form the polyhydric alcohol may be decreased since the condensation will continue while the etherification with the unsaturated halide is in progress.

When polyhydric alcohols are used which are condensation products of carbonyl-containing compounds or the like with formaldehyde or its homologues, it is not necessary to isolate these in order to carry out the further condensations herein described. Thus pentaerythritol, for example, may be prepared according to the usual procedure in aqueous medium from acetaldehyde and formaldehyde in the presence of alkali. Ordinarily a tedious isolation procedure follows. For the purpose of the present invention, however, this is unnecessary. Solid alkali or very concentrated caustic solution may be added directly to the reaction mixture after which this mixture is treated with the alkylating agent as previously described. This effects a substantial saving in the economics of the process.

If vinyl type ethers are prepared from acetylene or acetylene derivatives and a suitable catalyst, or from vinyl halides, it is necessary to adapt the reaction conditions to the nature of the reagents, but the principle, in general, is the same. In the event that the halides employed are not particularly reactive, elevated temperatures and pressures may be desirable. In some cases the more strenuous conditions attainable with an autoclave have been found to give excellent results.

Usually, the products obtained, because of their high molecular weight, are largely undistillable. In the initial condensation, however, to form the highly functional alcohol, some of the reagents, as for example, glycerol, may remain unreacted, or some of the polyfunctional alkylating agent may be hydrolyzed by the caustic, as for example, the hydrolysis of the glycerol dichlorohydrin to yield glycerol. If desired, this material may be distilled off directly from the polyhydric alcohol, or the unsaturated ethers may be formed, after which the low boiling material may be removed by distillation. However, it should be stressed that it is by no means necessary to remove the distillable portion of the reaction mixture, since its presence does not seriously affect the favorable properties of the product.

THE POLYMERIZATION OF THE UNSATURATED ETHERS

These unsaturated ether compositions may be used for a multiplicity of purposes such as solvents for various polymers, and as an ingredient in paint, varnish, enamel, lacquer and other protective coating compositions. In particular, however, the products are found to polymerize to yield highly desirable polymers either spontaneously or in the presence of such catalysts as heat, light, ultraviolet radiation, oxygen, ozone, peroxides such as benzoyl or lauryl peroxide, and metallic driers such as Pb, Co, Mn, Ni, Fe, etc. which are generally used in the form of their fat-soluble salts such as stearates or naphthenates, in order to accelerate the polymerization of protective coating films.

The products of polymerization vary somewhat in physical properties, depending on the molecular structure of the monomer employed, on the extent of polymerization, and on the method used to effect it. The polymers, however, are always clear and transparent and are substantially insoluble and infusible when completely polymerized. Intermediate polymers with a great variety of properties may also be secured.

By controlled polymerization there may be obtained highly viscous polymers which are polymerized to a degree short of gelation and which may be incorporated into suitable compositions in order to obtain excellent protective coatings such as varnishes, enamels and lacquers. Thus, whereas the ordinary protective coating is susceptible to the corrosive or deleterious effects of chemicals, alkali, acid, or heat, protective coatings prepared with these new compounds are extremely resistant to such agents. The preparation of these protective coatings may be accomplished by incorporation of the fusible and soluble polymer with the substances ordinarily employed in the protective coating industry. Pigmentation may be effected by the use of inorganic pigments such as zinc oxide, titanium oxide, etc., or by the use of organic coloring agents.

Upon the initial polymerization of the monomeric unsaturated ethers or solutions of these in suitable solvents by means of heating and exposure to air or oxygen or other similar device, a marked increase in viscosity is noted due to the formation of a polymer which has good solubility characteristics. With the products under discussion the viscosity may increase up to 100 to 300 centistokes at 98° C. without danger of gelation, depending upon the particular unsaturated ether involved. Still further polymerization causes the liquid to set to a soft gel which contains a substantial portion of a polymer which is insoluble in the monomer and in organic solvents. These gels are soft and fragile and tear and crumble on application of stress. They may be further polymerized, then, to the final infusible, insoluble state in which all of the polymer is substantially infusible and insoluble in organic solvents, acids, and alkalies.

When the polymerization is stopped short of gelation, the efficacy of the transparent, highly viscous, colorless material in protective coatings may be judged by casting a film of the product on glass, wood, or metal panels. In general this is best accomplished by dissolving the material in chloroform or some similarly powerful solvent. If desired a metallic drier such as Pb, Co, Mn, etc., in the form of the naphthenate or stearate, etc. may be added. This, however, is by no means necessary, although in the absence of a polymerization catalyst it is necessary to bake the film at a temperature of 70° C. or slightly higher in order to obtain a hard film in a short length of time. When a film is cast from a solution of the product in which metallic drier is present, drying at room temperature is sufficient to cause the formation of a smooth, clear, transparent coating which for all practical purposes is entirely insoluble and infusible and which is extremely hard. It adheres with marked tenacity to glass, wood and metal and is amazingly resistant to alkali, acid, water, and chemicals. Of course, heat may be employed in order to accelerate the formation of the insoluble and resistant film, for the time of polymerization of the highly viscous liquid to an infusible and insoluble film is largely a function of the temperature. At temperatures between 70–100° C., however, the time required is extremely short which makes these products particularly desirable in protective coatings such as enamels, which are baked or heat-cured.

These unsaturated ethers may also be used in molding compositions and for this purpose various procedures may be followed. Thus the compounds themselves may be cast polymerized. These polymers in their finally cured state are substantially infusible and insoluble, and in general, demonstrate excellent wear-resistance and durability.

Likewise, as indicated above, an intermediate state of polymerization may be attained in which the product is soluble in such organic solvents as acetone, carbon tetrachloride, chloroform, benzene, etc. In this state of polymerization, the products as indicated previously are thermoplastic and may be polymerized further to an infusible state to yield products similar to those mentioned in the preceding paragraph. That is, the fusible polymer may be molded or otherwise shaped and polymerized by means of heat to form highly resistant and permanently-shaped products.

The fusible polymer, likewise, may be subjected to still another procedure which is highly advantageous, and which involves removing a portion or all of the monomer and recovering the fusible polymer substantially free from monomer or at least containing much less monomer than is normally present in the monomer-polymer mixture referred to herein as the fusible polymer. The procedure whereby this is accomplished is described hereinafter. The fusible polymer, from which the monomer has been removed, may then be extruded, molded, shaped or otherwise worked into desirable forms, and after final shaping, the products may be cured or completely hardened and rendered infusible by any of the suitable methods involving heat, and/or catalysts.

The fractionation of the highly viscous liquid— that is, the removal of the monomer, may be effected by various procedures. The monomer may be extracted with a solvent in which the polymer is insoluble such as petroleum ether. Correspondingly, the mixture may be dissolved in a good solvent for the material such as acetone, chloroform, benzene, etc., after which the fusible polymer is precipitated by addition of a non-solvent for the polymer. The fusible polymers so produced are characteristic thermoplastic polymers soluble in such solvents as chloroform, benzene, acetone, dioxane, etc., which soften or flow on heating. They are precipitated from solutions by use of non-solvents as white amorphous powders or as plastic semi-liquid resins.

It should be mentioned that a partially fusible polymer may be obtained from the gelled polymer simply by treating the gel with a solvent such as methyl or ethyl alcohol. Thus the monomer and soluble polymer present is dissolved, and the gel swells considerably. Thereafter, it may be dried and powdered to yield a fusible polymer which can be cured according to the procedures indicated above.

A large number of inert substances may be incorporated with the fusible polymer before subjecting it to the molding condition. These may include plasticizers, softening agents, fillers, natural or synthetic resins, pigments, and organic dyestuffs.

*Example 1*

A mixture of commercial pentaerythritol (362 parts, combining weight=36.2) and aqueous sodium hydroxide (50%, 2640 parts) was heated to 90° C. after which glycerol dichlorohydrin (645 parts) was added with stirring. The exothermic reaction was controlled by external cooling after which the reaction mixture was maintained at 70° C. with stirring for 1½ hours. Thereafter allyl bromide (1210 parts) was added slowly with stirring at 70° C. over a period of two hours. At the end of this time the reaction mixture had assumed a homogeneous, creamy appearance. Heating and stirring was continued for four hours more after which the reaction product was diluted with water and extracted with ether. From the ether extract there was obtained a viscous material with an iodine number of 220.7 and a hydroxyl content of 5.7%.

This product had a viscosity at 98° C. of 11.4 centistokes. This value is more than three times greater than the viscosity of tetraallylpentaerythritol. The material gelled in 143 minutes when oxygen was passed through it at a rate of 6.8 liters per hour at a temperature of 98° C. When the polymerization was stopped just short of gelation there resulted a viscous, clear polymer which was still quite soluble in most organic reagents and which could be cast into films which possessed excellent properties. These films could be made to dry by baking for short periods of time at temperatures of 50-200° C. In addition, small amounts of metallic drier, such as the naphthenates of cobalt, lead, manganese, etc., allowed the drying to take place at room temperature.

*Example 2*

Glycerol (95%, 184 parts) was mixed with aqueous sodium hydroxide (50%, 176 parts) with external cooling. Thereafter, the mixture was heated to 90-95° C. and glycerol dichlorohydrin (129 parts) was added over a period of two and one-half hours with stirring. Thereafter, heating and stirring was continued for 6 hours more, after which the filtered reaction mixture was diluted to incipient cloudiness with acetone and was neutralized with hydrochloric acid. The reaction mixture was then filtered and the filtrate was evaporated under reduced pressure to yield a mixture of product and inorganic material from which the product could be extracted with absolute methanol. The alcohol was then removed under reduced pressure to yield a thick syrup with a hydroxyl content of 39.2%.

A mixture of 50 parts of this highly functional alcohol with 202.4 parts of 50% aqueous sodium hydroxide was heated with stirring to 75° C. after which allyl bromide (278 parts) was added slowly over a period of 3½ hours. The reaction was then continued for 2½ hours more. Thereafter the organic layer was separated and the aqueous layer was diluted with water and extracted with ether. The combined ether extract and the organic material was dried over sodium sulfate and concentrated to yield a product with an iodine number of 268.0 and a hydroxyl content of 1.3%. This material gelled in 190 minutes when oxygen was passed through it at a rate of 6.8 liters per hour at a temperature of 98° C.

A portion of the product was subjected to distillation some volatile material was removed at 85-120° C. at 3 mm. The residue which had an iodine number of 253.3 and a low hydroxyl content, gelled under the above conditions of polymerization in 174 minutes.

*Example 3*

Glycerol (95%, 129 parts) was mixed with aqueous sodium hydroxide (50%, 352 parts) with external cooling. Thereafter the mixture was heated to 90-95° C. and glycerol dichlorohydrin (258 parts) was added over a period of 2½ hours with stirring. Heating and stirring were continued for 6 hours more after which the reaction mixture was diluted with 500 parts of methyl alcohol neutralized with hydrochloric acid and filtered. The filtrate was evaporated under reduced pressure to yield a mixture of product and inorganic material from which the product was extracted with absolute methyl alcohol. There resulted a thick syrup with a hydroxyl content of 29.5%.

This highly functional alcohol (75 parts) was allylated as indicated in the preceding example using 229 parts of 50% aqueous sodium hydroxide and 314.6 parts of allyl bromide. The latter reagent was added over a period of 4 hours after which the reaction was allowed to continue for 2½ hours longer. The reaction mixture was worked up as indicated previously to obtain a product with an iodine number of 247.1 and a hydroxyl content of 1.5%. This product gelled in 120-135 minutes when oxygen was passed through it at the rate of 6.8 liters per hour at 98° C.

*Example 4*

A mixture of glycerol (64.5 parts, 95%) and aqueous sodium hydroxide (176 parts, 50%) was mixed and heated to 90-95° C. Thereafter glycerol dichlorohydrin (129 parts) was added over a 2 hour period with stirring after which stirring and heating was maintained for 5 hours more. This mixture was then cooled to 75° C. and 80 parts of solid, flaked sodium hydroxide was added together with 208 parts of 50% aqueous sodium hydroxide. Allyl bromide (508 parts) was then added dropwise over a period of 4 hours after which the reaction mixture was stirred and heated at 75° C. for 2½ hours longer. The reaction mixture was then diluted with water, the organic layer was separated and the aqueous layer was extracted with ether. The combined ether extract and the organic layer were dried over sodium sulfate and the ether was removed to obtain a product with an iodine number of 242 and a hydroxyl content of 1.5%. This material gelled under the conditions indicated previously in a period of 64 minutes.

When the product was subjected to distillation at 78-147° C. at 1.3 mm. some volatile material was removed. The residue from this distillation possessing an iodine number of 223.5 gelled under the same conditions in 68 minutes.

*Example 5*

Aqueous sodium hydroxide (50%, 352 parts) was heated to 90° C., after which glycerol dichlorohydrin (258 parts) was added with stirring at such a rate that the internal temperature did not at any time exceed 115° C. The addition was effected in 2½ hours after which stirring and heating at 95° C. was continued for 5 hours. The reaction mixture was then diluted with methanol, neutralized with dilute hydrochloric acid and filtered, after which the filtrate was concentrated under reduced pressure. The resulting material was extracted with absolute methanol, after which the solvent was evaporated to obtain a syrup with a hydroxyl content of 28.5%.

The mixture of the above polyhydric alcohol (73 parts) and aqueous sodium hydroxide (214.4 parts, 50%) was mixed and heated to 75° C. Thereafter allyl bromide (299 parts) was added with stirring over a period of 3¾ hours. Thereafter the reaction was continued for 2¾ hours more. The reaction mixture was worked up as indicated in previous examples to yield a product with an iodine number of 219.0 and a hydroxyl content of 1.3%. This material gelled in 77 minutes when oxygen was passed through it at the rate of 6.8 liters per hour at a temperature of 98° C. When the volatile material was removed from the reaction mixture at 85-170° C. at 3 mm., there resulted a light-colored residue which possessed an iodine number of 198 and which gelled in 70 minutes under the above conditions.

*Example 6*

Pentaerythritol (408 parts) was mixed with aqueous sodium hydroxide (50%, 528 parts) after which 2-chloroethyl ether (429 parts) was added. The entire mixture was placed in an autoclave and the reaction carried out for 6 hours, at which time the starting pressure of 160 pounds had decreased to 60 pounds. An average temperature of 150° C. was maintained throughout the reaction with vigorous stirring. The reaction mixture was then removed from the autoclave and was diluted with absolute methyl alcohol (500 parts) after which it was neutralized with hydrochloric acid. Thereupon the reaction mixture was filtered and the filtrate was concentrated under reduced pressure to yield a mixture of product and inorganic material from which the product was extracted with absolute methyl alcohol. It possessed a hydroxyl content of 22.6%.

This material (50 parts) was allyated by mixing it with aqueous sodium hydroxide (176 parts, 50%). This mixture was then heated to 75–80° C. and allyl bromide (242 parts) was added dropwise over a period of 3 hours. The reaction was then continued for 3 hours longer. Thereafter the organic layer was removed and the aqueous layer was diluted with water and extracted with ether. The combined ether extract and organic material was dried over sodium sulfate after which the ether was removed to yield a product with an iodine number of 212.0. This material when polymerized by passing oxygen through it at 98° C. at a rate of 6.8 liters per hour gelled in 160 minutes.

*Example 7*

Glycerol (95%, 288 parts) was mixed with aqueous sodium hydroxide (50%, 528 parts) with external cooling, after which there was added at 100° C. with stirring 2-chloroethyl ether (429 parts) over a period of 4½ hours. The reaction mixture was then stirred and heated at 105° C. for 8 hours longer. Thereupon the reaction mixture was filtered and the organic layer which was unreacted 2-chloroethyl ether was separated. The aqueous layer was neutralized with dilute hydrochloric acid, after which it was filtered, and the filtrate was concentrated in vacuo to yield a mixture from which the product was extracted with absolute methanol. It possessed a hydroxyl content of 33.6%.

A mixture of this highly functional alcohol (50.6 parts) and aqueous sodium hydroxide (176 parts, 50%) was heated to 80° C. after which allyl bromide (242 parts) was added over a period of 3 hours with vigorous stirring. The reaction was continued for 3 hours longer after which it was worked up as indicated in previous examples. There resulted a product with an iodine number of 268.8. This material when polymerized at 98° C. by passing oxygen through it at the rate of 6.8 liters per hour gelled in 190 minutes.

While various modifications of the above invention have been described, it is to be understood that the same is not limited thereto, but may be varied within the scope of the following claims.

We claim as our invention:

1. A non-hydrophilic, readily polymerizable, unsaturated liquid ether of a highly functional cross-linked alcohol, said highly functional alcohol resulting from the alkylation of a polyhydroxy compound with an alkylating agent containing a plurality of alkylating functions, the total number of groups capable of entering the alkylation reaction being at least 5, said highly functional alcohol being at least about 75% etherified with an unsaturated low molecular weight aliphatic group containing from 2–7 carbon atoms, said aliphatic group containing at least one unsaturated carbon to carbon linkage not more than three crbon atoms removed from the ether linkage.

2. A non-hydrophilic, readily polymerizable, unsaturated liquid ether of a highly functional cross-linked alcohol, said highly functional alcohol resulting from the alkylation of a polyhydroxy compound with a polyhalohydrin of a polyhydric alcohol, the total number of groups capable of entering the alkylation reaction being at least 5, said highly functional alcohol being at least about 75% etherified with an unsaturated low molecular weight aliphatic group containing from 2–7 carbon atoms, said aliphatic group containing at least one unsaturated carbon to carbon linkage not more than three carbon atoms removed from the ether linkage.

3. A non-hydrophilic, readily polymerizable, unsaturated liquid ether of a highly functional cross-linked alcohol, said highly functional alcohol resulting from the alkylation of a polyhydroxy condensation product of a carbonyl-containing compound and formaldehyde with an alkylating agent containing a plurality of alkylating functions, the total number of groups capable of entering the alkylation reaction being at least 5, said highly functional alcohol being at least about 75% etherified with an unsaturated low molecular weight aliphatic group containing from 2–7 carbon atoms, said aliphatic group containing at least one unsaturated carbon to carbon linkage not more than three carbon atoms removed from the ether linkage.

4. A non-hydrophilic, readily polymerizable, unsaturated liquid ether of a highly functional cross-linked alcohol, said highly functional alcohol resulting from the alkylation of a compound selected from the group consisting of mono- and disaccharides and their alcohols with an alkylating agent containing a plurality of alkylating functions, the total number of groups capable of entering the alkylation reaction being at least 5, said highly functional alcohol being at least about 75% etherified with an unsaturated low molecular weight aliphatic group containing from 2–7 carbon atoms, said aliphatic group containing at least one unsaturated carbon to carbon linkage not more than three carbon atoms removed from the ether linkage.

5. A non-hydrophilic, readily polymerizable, unsaturated liquid ether of a highly functional cross-linked alcohol, said highly functional alcohol resulting from the alkylation of glycerol with an alkylating agent containing a plurality of alkylating functions, the total number of groups capable of entering the alkylation reaction being at least 5, said highly functional alcohol being at least about 75% etherified with an unsaturated low molecular weight aliphatic group containing from 2–7 carbon atoms, said aliphatic group containing at least one unsaturated carbon to carbon linkage not more than three carbon atoms removed from the ether linkage.

6. A non-hydrophilic, readily polymerizable, liquid allyl ether of a highly functional cross-linked alcohol, said highly functional alcohol resulting from the alkylation of a polyhydroxy compound with an alkylating agent containing a plurality of alkylating functions, the total number of groups capable of entering the alkylation reaction being at least 5, said highly functional alcohol being at least 75% allylated.

7. A non-hydrophilic, readily polymerizable, liquid allyl ether of a highly functional cross-linked alcohol, said highly functional alcohol resulting from the alkylation of a polyhydroxy compound with a polyhalohydrin of a polyhydric alcohol, the total number of groups capable of entering the alkylation reaction being at least 5, said highly functional alcohol being at least about 75% allylated.

8. A non-hydrophilic, readily polymerizable, liquid allyl ether of a highly functional cross-linked alcohol, said highly functional alcohol resulting from the alkylation of a polyhydroxy condensation product of a carbonyl-containing compound and formaldehyde with an alkylating agent containing a plurality of alkylating functions, the total number of groups capable of entering the alkylation reaction being at least 5, said highly functional alcohol being at least about 75% allylated.

9. A non-hydrophilic, readily polymerizable, liquid allyl ether of a highly functional cross-linked alcohol, said highly functional alcohol resulting from the alkylation of a compound selected from the group consisting of mono- and disaccharides and their alcohols with an alkylating agent containing a plurality of alkylating functions, the total number of groups capable of entering the alkylation reaction being at least 5, said highly functional alcohol being at least about 75% allylated.

10. A non-hydrophilic, readily polymerizable, liquid allyl ether of a highly functional cross-linked alcohol, said highly functional alcohol resulting from the alkylation of glycerol with an alkylating agent containing a plurality of alkylating functions, the total number of groups capable of entering the alkylation reaction being at least 5, said highly functional alcohol being at least about 75% allylated.

11. Polymers of a non-hydrophilic, readily polymerizable, unsaturated liquid ether of a highly functional cross-linked alcohol, said highly functional alcohol resulting from the alkylation of a polyhydroxy compound with an alkylating agent containing a plurality of alkylating functions, the toal number of groups capable of entering the alkylation reaction being at least 5, said highly functional alcohol being at least about 75% etherified with an unsaturated low molecular weight aliphatic group containing from 2-7 carbon atoms, said aliphatic group containing at least one unsaturated carbon to carbon linkage not more than three carbon atoms removed from the ether linkage.

12. Polymers of a non-hydrophilic, readily polymerizable, unsaturated liquid ether of a highly functional cross-linked alcohol, said highly functional alcohol resulting from the alkylation of a polyhydroxy compound with a polyhalohydrin of a polyhydric alcohol, the total number of groups capable of entering the alkylation reaction being at least 5, said highly functional alcohol being at least about 75% etherified with an unsaturated low molecular weight aliphatic group containing from 2-7 carbon atoms, said aliphatic group containing at least one unsaturated carbon to carbon linkage not more than three carbon atoms removed from the ether linkage.

13. Polymers of a non-hydrophilic, readily polymerizable, unsaturated liquid ether of a highly functional cross-linked alcohol, said highly functional alcohol resulting from the alkylation of polyhydroxy condensation product of a carbonyl-containing compound and formaldehyde with an alkylating agent containing a plurality of alkylating functions, the total number of groups capable of entering the alkylation reaction being at least 5, said highly functional alcohol being at least about 75% etherified with an unsaturated low molecular weight aliphatic group containing from 2-7 carbon atoms, said aliphatic group containing at least one unsaturated carbon to carbon linkage not more than three carbon atoms removed from the ether linkage.

14. Polymers of a non-hydrophilic, readily polymerizable, unsaturated liquid ether of a highly functional cross-linked alcohol, said highly functional alcohol resulting from the alkylation of a compound selected from the group consisting of mono- and disaccharides and their alcohols with an alkylating agent containing a plurality of alkylating functions, the total number of groups capable of entering the alkylation reaction being at least 5, said highly functional alcohol being at least about 75% etherified with an unsaturated low molecular weight aliphatic group containing from 2-7 carbon atoms, said aliphatic group containing at least one unsaturated carbon to carbon linkage not more than three carbon atoms removed from the ether linkage.

15. Polymers of a non-hydrophilic, readily polymerizable, unsaturated liquid ether of a highly functional cross-linked alcohol, said highly functional alcohol resulting from the alkylation of glycerol with an alkylating agent containing a plurality of alkylating functions, the total number of groups capable of entering the alkylation reaction being at least 5, said highly functional alcohol being at least about 75% etherified with an unsaturated low molecular weight aliphatic group containing from 2 to 7 carbon atoms, said aliphatic group containing at least one unsaturated carbon to carbon linkage not more than three carbon atoms removed from the ether linkage.

16. Process of producing a non-hydrophilic, readily polymerizable, unsaturated liquid ether of a highly functional cross-linked alcohol which comprises reacting in the presence of alkali at a temperature within the approximate range of 70–110° C. and for a time period of from 1 to 4 hours, a halide containing a low molecular weight aliphatic group containing from 2–7 carbon atoms, said aliphatic group containing at least one unsaturated carbon to carbon linkage not more than three carbon atoms removed from the halogen atom, with a highly functional alcohol resulting from the alkylation in the presence of alkali at a temperature not in excess of 150° C. and for a time period of 1 to 12 hours, of a polyhydroxy compound with an alkylating agent containing a plurality of alkylating functions, the total number of groups capable of entering the alkylation reaction being at least 5.

17. Process of producing a non-hydrophilic, readily polymerizable, unsaturated liquid ether of a highly functional cross-linked alcohol which comprises reacting in the presence of alkali at a temperature within the approximate range of 70–110° C. and for a time period of from 1 to 4 hours, a halide containing a low molecular weight aliphatic group containing from 2–7 carbon atoms, said aliphatic group containing at least one unsaturated carbon to carbon linkage not more than three carbon atoms removed from the halogen atom, with a highly functional alcohol resulting from the alkylation in the presence of alkali at a temperature not in excess of 150° C. and for a time period of 1 to 12 hours, of a polyhydroxy compound with a polyhalohydrin of a polyhydric alcohol, the total number of groups capable of entering the alkylation reaction being at least 5.

18. Process of producing a non-hydrophilic, readily polymerizable, unsaturated liquid ether of a highly functional cross-linked alcohol which comprises reacting in the presence of alkali at a temperature within the approximate range of 70–110° C. and for a time period of from 1 to 4 hours, a halide containing a low molecular weight aliphatic group containing from 2–7 carbon atoms, said aliphatic group containing at least one unsaturated carbon to carbon linkage not more than three carbon atoms removed from the halogen atom, with a highly functional alcohol resulting from the alkylation in the presence of alkali at a temperature not in excess of 150° C. and for a time period of 1 to 12 hours, of a polyhydroxy condensation product of a carbonyl-containing compound and formaldehyde with an alkylating agent containing a plurality of alkylating functions, the total number of groups capable of entering the alkylation reaction being at least 5.

19. Process of producing a non-hydrophilic, readily polymerizable, unsaturated liquid ether of a highly functional cross-linked alcohol which comprises reacting in the presence of alkali at a temperature within the approximate range of 70–110° C. and for a time period of from 1 to 4 hours, a halide containing a low molecular weight aliphatic group containing from 2–7 carbon atoms, said aliphatic group containing at least one unsaturated carbon to carbon linkage not more than three carbon atoms removed from the halogen atom, with a highly functional alcohol resulting from the alkylation in the presence of alkali at a temperature not in excess of 150° C. and for a time period of 1 to 12 hours, of a compound selected from the group consisting of mono- and disaccharides and their alcohols with an alkylating agent containing a plurality of alkylating functions, the total number of groups capable of entering the alkylation reaction being at least 5.

20. Process of producing a non-hydrophilic, readily polymerizable, unsaturated liquid ether of a highly functional cross-linked alcohol which comprises reacting in the presence of alkali at a temperature within the approximate range of 70–110° C. and for a time period of from 1 to 4 hours, a halide containing a low molecular weight aliphatic group containing from 2–7 carbon atoms, said aliphatic group containing at least one unsaturated carbon to carbon linkage not more than three carbon atoms removed from the halogen atom, with a highly functional alcohol resulting from the alkylation in the presence of alkali at a temperature not in excess of 150° C. and for a time period of 1 to 12 hours, of glyceral with an alkylating agent containing a plurality of alkylating functions, the total number of groups capable of entering the alkylation reaction being at least 5.

21. A process of producing a non-hydrophilic, readily polymerizable, unsaturated liquid ether of a highly functional cross-linked alcohol which comprises reacting a polyhydroxy compound with an alkylating agent containing a plurality of alkylating functions, the total number of groups capable of entering the alkylation reaction being at least 5, in the presence of caustic alkali at a temperature not in excess of 150° C. and for a time period of 1 to 12 hours, adding to the resultant reaction mixture without isolation of the highly functional alcohol, a halide containing a low molecular weight aliphatic group containing from 2–7 carbon atoms, said aliphatic group containing at least one unsaturated carbon to carbon linkage not more than three carbon atoms removed from the halogen atom, and maintaining the reaction mixture at a temperature within the approximate range of 70–110° C. for a period of from 1 to 4 hours to produce the unsaturated ether of the highly functional alcohol.

22. Process of producing a non-hydrophilic, readily polymerizable, unsaturated liquid ether of a highly functional cross-linked alcohol which comprises condensing a carbonyl-containing compound in the presence of an alkaline catalyst to produce a polyhydroxy compound, adding an alkylating agent containing a plurality of alkylating functions to the reaction mixture, maintaining the reaction mixture at a temperature not in excess of 150° C. for a period of 1 to 12 hours to transform said polyhydroxy compound into a highly functional alcohol, adding to the resultant reaction mixture a halide containing a low molecular weight aliphatic group containing from 2–7 carbon atoms, said aliphatic group containing at least one unsaturated carbon to carbon linkage not more than three carbon atoms removed from the halogen atom, and maintaining the reaction mixture at a temperature within the approximate range of 70–110° C. for a period of time of from 1 to 4 hours to produce the unsaturated ether of the highly functional alcohol, each of the above reactions being carried out without isolation of the intermediate reaction products.

23. A non-hydrophilic, readily polymerizable, unsaturated liquid ether of a highly functional cross-linked alcohol, said highly functional alcohol resulting from the alkylation of polyglycerol with, an alkylating agent containing a plurality of alkylating functions, the total number of groups capable of entering the alkylation reaction being at least 5, said highly functional alcohol being at least about 75% etherified with an unsaturated low molecular weight aliphatic group containing from 2–7 carbon atoms, said aliphatic group containing at least one unsaturated carbon linkage not more than three carbon atoms removed from the ether linkage.

24. A non-hydrophilic, readily polymerizable, liquid allyl ether of a highly functional cross-linked alcohol, said highly functional alcohol resulting from the alkylation of polyglycerol with an alkylating agent containing a plurality of alkylating functions, the total number of groups capable of entering the alkylation reaction being at least 5, said highly functional alcohol being at least about 75% allylated.

25. Polymers of a non-hydrophilic, readily polymerizable, unsaturated liquid ether of a highly functional cross-linked alcohol, said highly functional alcohol resulting from the alkylation of polyglycerol with an alkylating agent containing a plurality of alkylating functions, the total number of groups capable of entering the alkylation reaction being at least 5, said highly functional alcohol being at least about 75% etherified with an unsaturated low molecular weight aliphatic group containing from 2–7 carbon atoms, said aliphatic group containing at least one unsaturated carbon to carbon linkage not more than three carbon atoms removed from the ether linkage.

26. Process of producing a non-hydrophilic, readily polymerizable, unsaturated liquid ether of a highly functional cross-linked alcohol which comprises reacting in the presence of alkali at a temperature within the approximate range of 70–110° C. and for a time period of from 1 to 4 hours, a halide containing a low molecular weight aliphatic group containing from 2-7 carbon atoms, said aliphatic group containing at least one unsaturated carbon to carbon linkage not more than three carbon atoms removed from the halogen atom, with a highly functional alcohol resulting from the alkylation in the presence of alkali at a temperature not in excess of 150° C. and for a time period of 1 to 12 hours, of polyglycerol with an alkylating agent containing a plurality of alkylating functions, the total number of groups capable of entering the alkylation reaction being at least 5.

JOHN ROBERT ROACH.
HAROLD WITTCOFF.

REFERENCES CITED

The following references are of record in the file of this patent:

UNITED STATES PATENTS

| Number | Name | Date |
|---|---|---|
| 1,936,093 | Lawson | Nov. 21, 1933 |
| 2,042,219 | Groll et al. | May 26, 1936 |
| 2,302,121 | Harris | Nov. 17, 1942 |
| 2,324,483 | Castan | July 20, 1943 |
| 2,327,053 | Marple et al. | Aug. 17, 1943 |
| 2,332,895 | D'Alelio | Oct. 26, 1943 |
| 2,450,234 | Evans et al. | Sept. 28, 1948 |
| 2,537,726 | Wittcoff et al. | Jan. 9, 1951 |

FOREIGN PATENTS

| Number | Country | Date |
|---|---|---|
| 317,770 | Great Britain | Aug. 19, 1929 |